United States Patent [19]
Umina

[11] Patent Number: 4,590,078
[45] Date of Patent: May 20, 1986

[54] PROCESS AND APPARATUS FOR PREPARING CANNED BAKED PRODUCTS

[76] Inventor: Anthony P. Umina, 5722 Kenwick, San Antonio, Tex. 78238

[21] Appl. No.: 502,508

[22] Filed: Jun. 9, 1983

[51] Int. Cl.$^4$ .............. A21D 8/06; A21D 10/02; B65D 81/34; B65B 25/22
[52] U.S. Cl. .................. 426/113; 220/366; 220/367; 220/256; 229/DIG. 14; 426/118; 426/124; 426/128; 426/395; 426/394; 426/403; 426/549; 426/551; 426/552; 426/553
[58] Field of Search ............. 426/128, 113, 118, 395, 426/403, 394; 220/366, 373, 374, 256, 367; 229/DIG. 14

[56] References Cited
U.S. PATENT DOCUMENTS

| | | | |
|---|---|---|---|
| 364,665 | 6/1887 | Norton | 220/373 |
| 451,198 | 4/1891 | Adams | 220/373 |
| 933,103 | 9/1909 | Nortons | 220/373 |
| 965,799 | 7/1910 | Dickerson | 220/373 |
| 1,904,741 | 4/1933 | Lorber | 426/118 |
| 2,845,356 | 7/1958 | Battiste . | |
| 2,858,220 | 10/1958 | Battiste | 426/128 |
| 3,323,442 | 6/1967 | Rader | 426/113 |
| 3,718,482 | 2/1973 | Davis et al. . | |
| 3,769,028 | 10/1973 | Katz et al. . | |
| 4,058,214 | 11/1977 | Mancuso | 220/366 |
| 4,120,984 | 10/1978 | Richardson et al. . | |
| 4,137,333 | 1/1979 | Daswick | 426/113 |
| 4,456,625 | 6/1984 | Durst | 426/128 |

FOREIGN PATENT DOCUMENTS 1337956 11/1973 United Kingdom ............... 220/366

*Primary Examiner*—Steven Weinstein
*Attorney, Agent, or Firm*—Penrose Lucas Albright

[57] ABSTRACT

Process and apparatus for preparing baked products in tray-shaped cans, whereby venting means are provided as part of the baking apparatus for transfer of generated steam and gases from the inside of the can. Covers are provided with channels for directing the outflow of steam and gases through a partially clinched lid of a tray-shaped baking can, while the baking is taking place. The baked product is permitted to rise uniformly, with no deformation that would normally occur when the steam and gases act to depress the baked product if they are confined to the baking can. Because a lighter, lower water-active batter is required for the process of the invention, the resulting baked product is light and evenly baked and has a substantially extended shelf-life.

19 Claims, 13 Drawing Figures

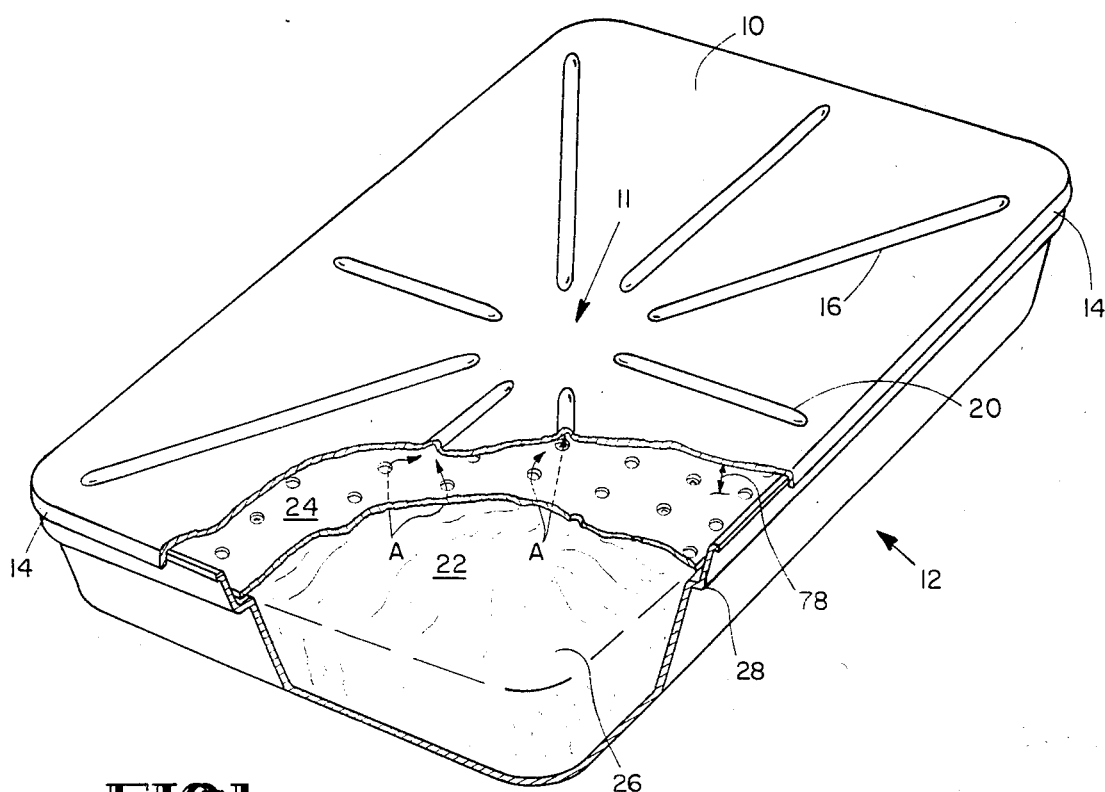
FIG.1
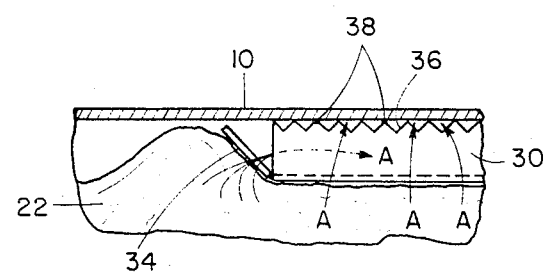
FIG.2b
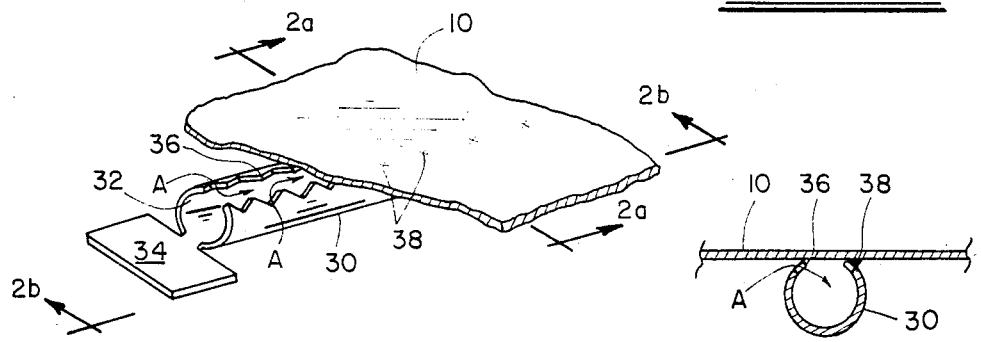
FIG.2   FIG.2a

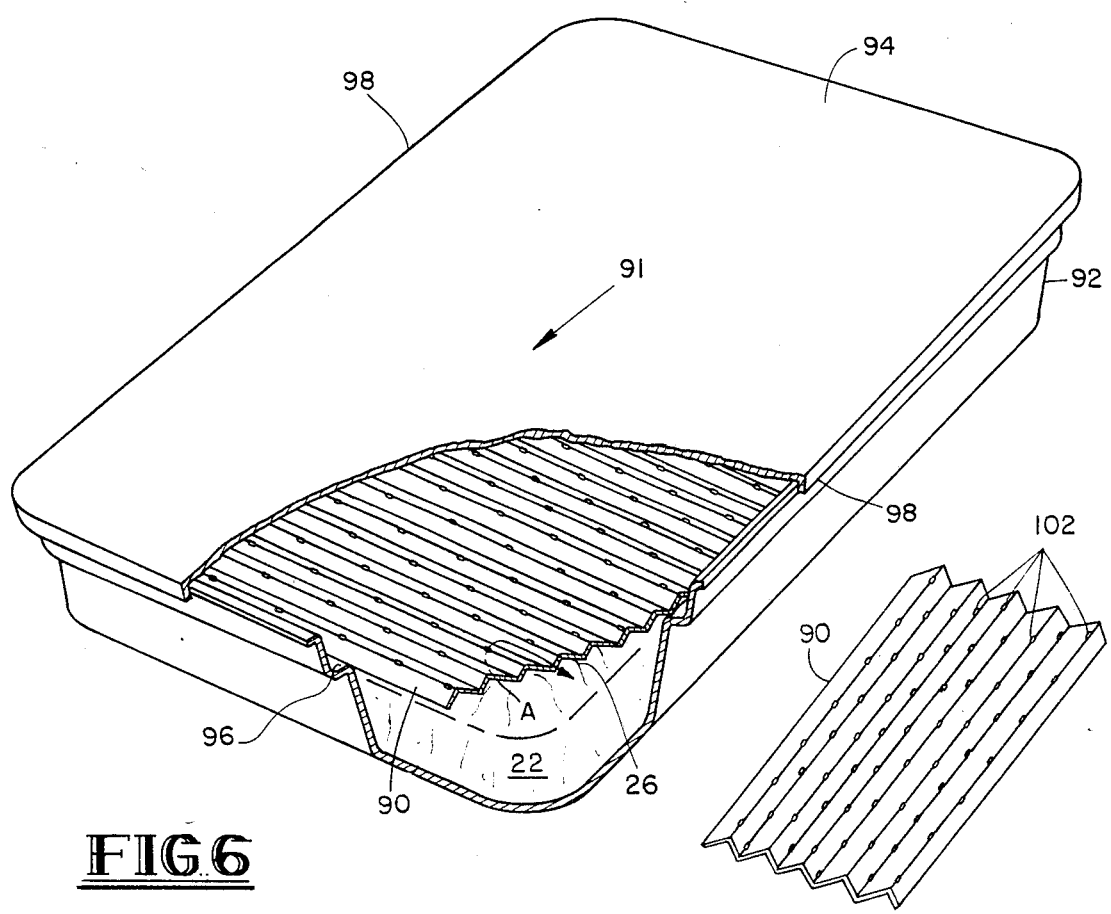
FIG.6
FIG.6a
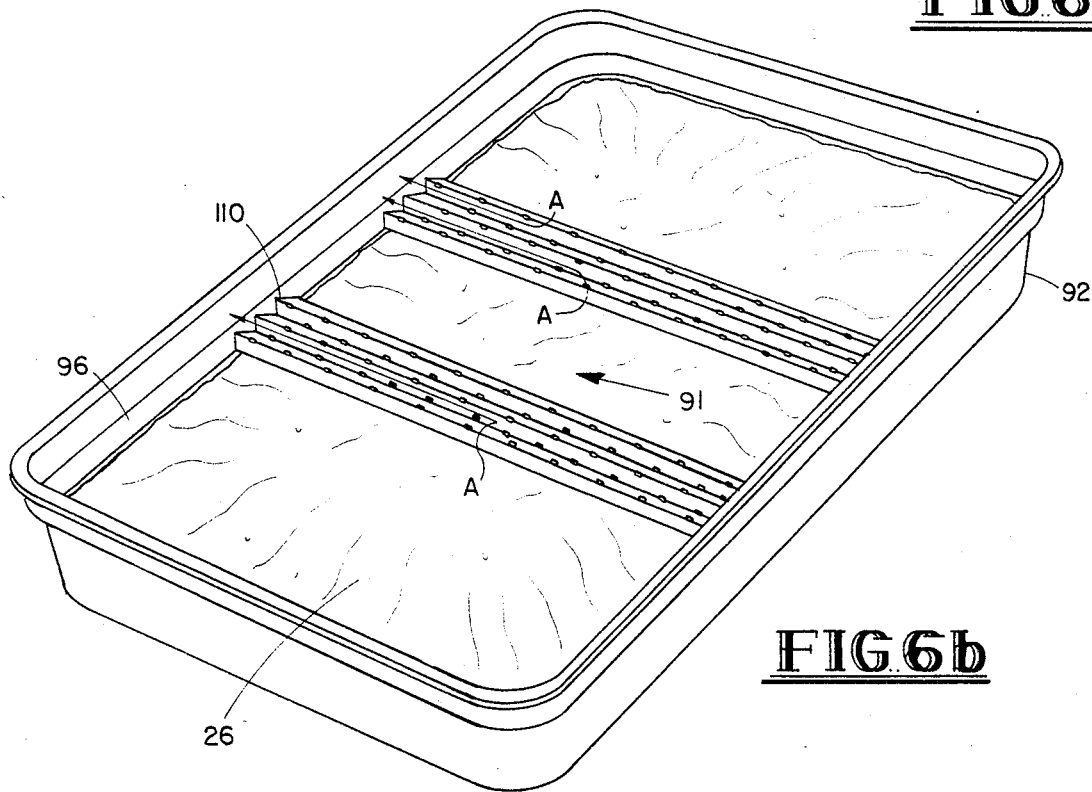
FIG.6b

PROCESS AND APPARATUS FOR PREPARING CANNED BAKED PRODUCTS

BACKGROUND OF THE INVENTION

This invention relates to the process of preparing canned baked items. The process described can be used for all types of cakes, sweet breads, breads, or any other baked product, and primarily relates to the use of tray-shaped cans. Bread and cakes have been baked in standard round cans for many years as may be seen in the many military specifications relative to canned cakes and bread, and also to U.S. Pat. No. 2,845,356 by Donald A. Battiste, July 29, 1958.

BRIEF DESCRIPTION OF THE PRIOR ART

It is well known in the prior art that when preparing baked goods for commercial use, it is necessary to make allowances for the escape of steam and gases during the cooking process if the baked goods are subsequently sealed in the package. Richardson, et al describes a process in U.S. Pat. No. 4,120,984 for allowing steam to escape through perforations or vents in a container, which perforations or vents are then sealed at the conclusion of baking. This sealing is accomplished by utilizing a heat sensitive flexible packaging material and applying heat to the vented portion. Battiste accomplishes the same venting process by merely allowing the overlapping edges of the metal cans described in U.S. Pat. No. 2,845,356 to be partially clinched until final baking. After complete clinching, a vacuum of between 26½ and 29½ inches of Hg is imposed on the metal can because of the effect of condensation.

The problem of generated steam and gases acting to deform and alter the baked product where no provision is made for their release is well recognized, and in fact is described in U.S. Pat. No. 3,769,028, Katz, et al. Therein, flexible pouches are utilized for baking and one of the problems discussed is that the materials contained in the pouches normally become misshapen because of internal pressure. The solution described in Katz, et al includes a special cooking vessel and pressure and temperature sensing cells to maintain the external pressure on the pouches such that product deformation will not occur.

Davis, et al, in U.S. Pat. No. 3,718,483, recognizes the problem of cooking in hermetically sealed containers because of the internal generation of steam and gases which would tend to make the resulting product rubbery and undesirable. In Davis, et al, the problem is attempted to be solved by carefully controlling the formula used for the product to control moisture content and the leavening agent and sealing the can under a vacuum before baking takes place.

Although Battiste indicates that pH and moisture control are critical when sealing baked products in containers, work done at the National Food Processors Association Laboratory in Washington, D.C. has indicated that pH and moisture control are not necessary to the preservation of canned baked items as long as the water activity of the product remains below 0.95% relative humidity.

Tray-shaped cans, or large-lid cans have introduced new problems to the canned baked goods industry. With the average round can, the surface area of the top is not so large as to present any problem in the escape of gases. The batter is filled into the can in an amount which will result in a full can after normal baking. As the baked product rises either due to yeast or chemical leavening action, gases escape through the loosely clinched lid as described by Battiste.

However, in a can with a large flat top, such as a ½ steam table tray can, or other large surface area cans, this internally generated gas and steam becomes entrapped within the covered area and cannot escape through loosely clinched lids. These gases build up an internal pressure on the product center which causes the product to fall. Where the goods being baked in a tray can container have a large surface area, gases evolve from the large flat bottom area and push their way up through the soft center area which is the last portion to be baked since it is most distant from oven heat. The outer periphery of the product is the first to heat and set by coagulation of protein and swelling of starches and therefore pushes up against the top of the container essentially forming a peripheral seal against gases trapped in the center area. These gases then become pressurized, and because the batter on the periphery has already set, they begin to exert their force on the least resistant mass, the center soft area of the baked product, thus causing a depression in the center of the baked product.

Resistance to this internal pressure can be obtained to a degree by using more of the common toughening ingredients used in baking such as flour, eggs, and milk, but the effect cannot be totally overcome and the resulting imbalance in formulation produces an undesirable baked product, with a much decreased shelf life.

Because the edge portion of the product being baked rises much sooner than the middle portion placing pressure upon the lid, the middle portion of the baked product is effectively sealed off from the outside. Gases subsequently evolve from the as yet unbaked center portion, create an internal pressure in the center, and push on the center of the baked item, causing it to lose its leavening and fall in the center. Simple perforations in the lid or in any batter covering device such as those described in Richardson, et al become obstructed on rising of the batter and are of little or no effect in venting steam and gases.

It is further known that volatile by-products of yeast fermentation retained within the container through the baking and sealing operations cause undesirable flavors and dark color upon storage. Proper venting of the can as provided by the invention minimizes this effect.

SUMMARY OF THE INVENTION

It is therefore an object of the present invention to provide a process of preparing canned cake, sweet dough, and bread items in a tray-shaped can or other large-size cans such that the sealing takes place after the baking operation and the water activity of the product can remain below 0.95% relative humidity.

Another object of this invention is to prevent the falling and depression caused by the gases trapped in the center of a container, by a mechanical means so as not to interfere with the delicate formulation of the product which is required to obtain extended shelf life.

It is a further object of the invention to provide venting means in tray-shaped cans or other large-lid cans so that steam and gases may be allowed to escape from the baking container during baking operations such that deformation of the baked product by internally generated steam and gases is discouraged, even though portions of the container lid may be otherwise sealed off by rising dough.

It is still a further object of this invention to minimize or virtually eliminate the undesirable flavors and dark colors caused by bi-products of yeast fermentation, by properly venting gases during the baking and sealing operation.

According to the present invention, a process is provided for preparing canned cake, sweet dough, and bread items in tray-shaped or other large-size cans with venting means specially adapted to the tray-shaped or large-size cans to allow for the escape of steam and gases during the baking operation so that the baked product does not become deformed by the pressure generated from steam and gases.

Essentially the process involves the mechanical evacuation of gases as they are generated, thus preventing the pressure sufficient to cause the center depressions to form. Evacuation of the steam and gases is effected by providing channels in the lid or cover, which would bring the gases to the outer edge of the can and through unclinched or partially clinched seams. Since these channels would normally fill with raised baking products, they may also become blocked and lose their effectiveness. This may be offset by various means, such as providing a perforated sheet of food-approved parchment or other approved sheet material to allow the gases to follow the channels in the lid.

BRIEF DESCRIPTION OF THE DRAWINGS

FIG. 1 is a partially sectioned view of one embodiment of the baking can of the invention. FIGS. 2, 2a, and 2b show views of venting tubes that may be attached to a baking can lid to implement the invention. FIGS. 6, 6a, and 6b show an embodiment of the invention utilizing corrugated sheets or strips to accomplish venting.

DETAILED DESCRIPTION OF THE PREFERRED EMBODIMENT

Figure 3:
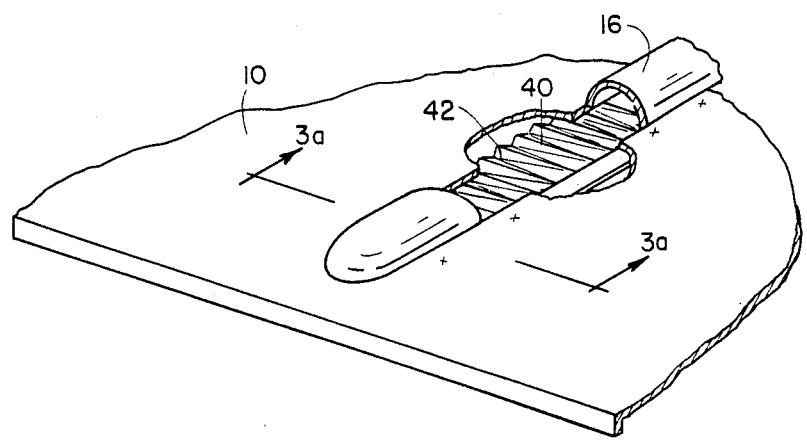
FIGS. 3 and 3a show another embodiment of a venting device that may be a part of a baking can lid.

Referring now to FIG. 1, there is shown a lid 10 of a typical tray-shaped baking can 12 with outer edges 14 suitable for crimping. Raised channels 16 may be provided in lid 10 as venting means to provide a path for the gases A to move from the center of baking area (not shown) to the outer periphery 20 of the can 12 so that the gases A may be vented as shown by the arrow. In order to prevent these channels 16 from becoming filled with baked product 22 as the product arises, the channels 16 may be separated from baked product 22 by the placement of a perforated sheet 24 of food-approved parchment or other approved sheet material to permit the gases A to follow the channels 16 in the lid 10.

Perforated sheet 24 may be made of such dimensions as will allow ledge 28 to support perforated sheet 24 at its outer edge. However, perforated sheet 24 works equally well if it is dimensioned to rest on the batter after it is placed in baking can 12 so that, as baking progresses, perforated sheet 24 rises with baked product 22 Channels 16 remain unobstructed as gases A evolve as shown in FIG. 1.

Because the obstruction boundary 26 caused by a product 22 rising is along the outer periphery 20, it is not necessary for the channels 16 to extend all the way to the center of the lid 10. It is only necessary that the channels 16 project sufficiently far into the center area 11 to terminate inside the area eventually defined by the product rising to contact the periphery 20 of the lid 10 of the baking can 12. Although a particular orientation of channels 16 has been illustrated in FIG. 1, this is by way of illustration only. Channels 16 may be oriented in any manner that will provide venting paths from the center area 11 of baking can 10 to its outer periphery 20.

Another effective method of removing the entrapped pressure of the central area 11 of the baking can 12 is to provide cylindrical, flexible tubes 30 as shown in FIG. 2 as an alternative means to the channels 16 described in FIG. 1. Tube 30 can be provided with end 32 open such that a flap 34 is provided at end 32. As seen in FIG. 2a, tubes 30 are unattached to lid 10 along longitudinal edge 36 to provide flexibility. Longitudinal edge 36 may be ridged or serrated as shown in FIG. 2a to facilitate entry of steam and gases into tube 30. Tubes 30 may be of random length and may be attached only along one side 38 to lid 10 in a manner as shown in FIG. 2a or in any other manner such that venting means are provided from the center area 11 of the lid 10 to its outer periphery 20. Tubes 30 may be permanently attached by means such as gluing or soldering, or may be temporarily attached to lid 10. As baked product 22 (batter) rises, serrated longitudinal edge 36 is forced upward and comes in contact with lid 10. Further, flap 34 is disposed in such a way that flap 34 may also be pushed up by the batter pressure thus effectively sealing cylindrical tubes 30 from filling with the batter while at the same time allowing gases A and steam to enter the tubes 30 through an opening between flap 34 and lid 10 and through the longitudinal serrations along edge 36, as shown in FIG. 2b. Tubes 30 may be secured to lid 10 by attaching either along edge 36 or edge 38 of the tubes 30 thereby allowing gas to enter through edge 36 as well as around flap 34. Edge 36 may be provided with serrated, sawtooth or other roughened edges to allow easier entrance of gases and guard against obstruction by batter. Flexible tubes 30 may be incorporated into lid 10 during manufacture or may be attached as an add-on to conventional lids.

Many variations of the invention are possible. Typical variations would include a flap 40 as shown in FIG. 3. Flap 40 may be provided attached in a permanent manner to a lid 10 with raised channel 16, distributed for instance as is shown in FIG. 1.

Figure 3A:
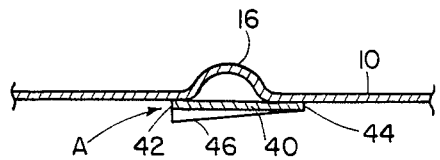

Flap 40 may be provided with fluted edge 42 along its longitudinal axis so as to maintain an air space between it and lid 10. Flap 40 may be attached at 44 (shown in FIG. 3a) by adhesive or some other permanent means. Flap 40 may be provided at each of the channels 16 in lid 10. Edge 46 of flap 40 would remain free to move. Fluted edge 42 maintains an air space, thus permitting entrance of gases A into channels 16 even after the batter pressure has caused flap 40 to come in contact at edge 46 with lid 10.

Figure 4:
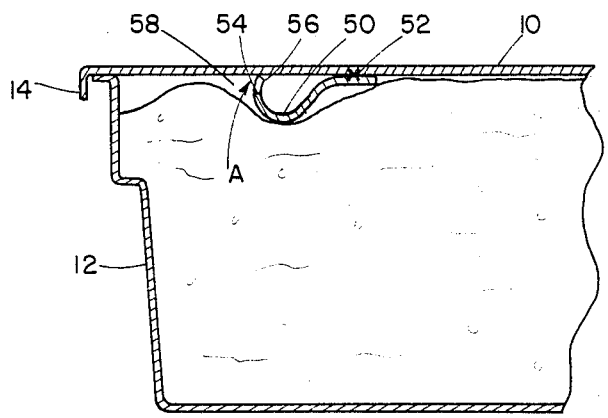
FIGS. 4 and 4a show still another embodiment of a venting device that may be attached to a conventional baking can lid.
Figure 4A:
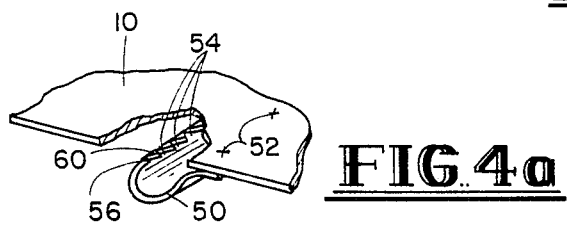

Another variation of the invention can be shown by referring to FIG. 4 wherein tube 50 is shown attached to lid 10, the channels being distributed as hereinbefore shown as in FIG. 1 or in any manner so that communication or channels are established for venting means from the center area 11 of lid 10 to its outer periphery 20, outside the sealed-off area caused by batter rising at 26 on the periphery of the baking can 12. Tube 50 may be attached at 52, either by temporary or permanent means. Tube 50 is typically a flexible member, made out of flexible metal, plastic, synthetic or other food-approved material. Flexibility is necessary to allow tube 50 to be pressed up by baked product 22 (batter) rising while still retaining opening 54 between edge 56 and lid 10 to allow the entrance of gases A or steam to be vented. Curved or convex edge 56 is required to maintain an opening at area 58 for entrance of gases A. Tube 50 may be incorporated into lid 10 during manufacture or may be used as an add-on device with convention baking and lids. The tubes may be of random lengths, as necessary to provide the necessary venting paths from the center area 11 of a baking can lid 10 to its outer periphery. To aid in the entrance of gases A into tube 50, tube 50 may be provided with a roughened or serrated edge 60 along free edge 56, as shown in FIG. 4a. The serrated edge 60 facilitates gas or steam passage through area 58 (FIG. 4) and out tube 50, through unclinched or partially clinched edge 14 of lid 10. As shown in FIG. 4a, tube 50 remains attached to lid 10 along edge 52.

Figure 5:
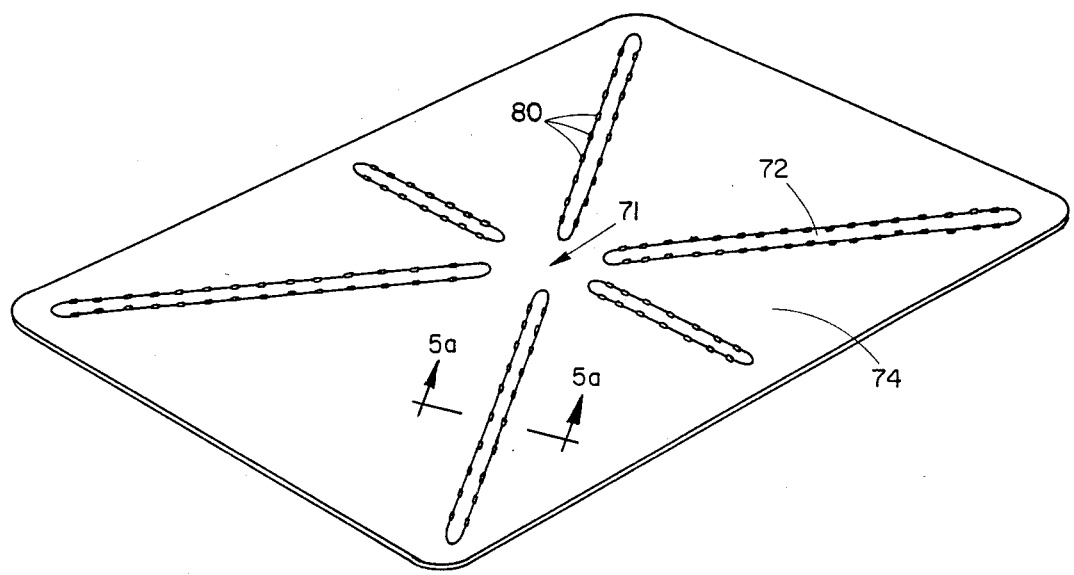
FIGS. 5 and 5a show a baking can sheet that may be placed over batter for allowing venting to occur.
Figure 5A:
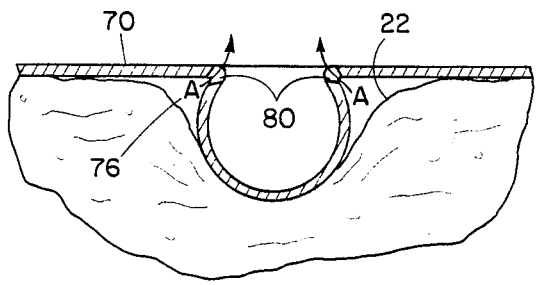

Still another variation of the invention can be illustrated by reference to FIG. 5. In FIG. 5, a sheet 70 is shown with channels 72 located thereon. Multiple channels 72 may be distributed in the manner as shown, or in any manner to establish communication between the inner or central area 71 of sheet 70 and its outer periphery 74. Each channel 72 is shaped as shown in FIG. 5a, in a circular or other manner so that opening 76 is left between the underside of sheet 70 and either side of channel 72. The underside of sheet 70 is designed to come into contact with baked product 22 (batter) placed in a baking can, while the outside or topside of sheet 70 faces lid 10 of baking can 12 shown in FIG. 1.

Sheet 70 is manufactured from rigid or semi-rigid material so that the shape as indicated in FIG. 5 is at all times maintained. Each channel 72 is also rigid or semi-rigid, so that opening 76 is at all times maintained.

One preferred embodiment of operation using sheet 70 is as follows, referring also to FIG. 1: Baking can 12 is arranged with ledge 28 to support sheet 70. Space 78 is left above sheet 70 to allow for rising of the baked product 22 placed in can 12. Baked product 22 (batter) is placed in can 12 and sheet 70 is put in place, resting on and supported by ledge 28. Lid 10 is then placed on can 12 in such a manner that its edges are left unclinched or partially clenched at 14.

As baking proceeds, baked product 22 rises into contact with sheet 70. Sheet 70 then rises with baked product 22, all the while venting steam and gas through channels 72. Venting is accomplished because at the juncture of channels 72 with sheet 70, perforations 80 are provided in sheet 70. As batter rises into contact with channel 72, opening 76 is maintained and it is not covered by batter because of the shape of channel 72, so that steam and gases escape through openings 80 and through unclinched lid 10, thus allowing the center area of baked product 22 to rise at the same rate as the outer periphery 26 of the baked product 22.

The venting means may be formed from any food-approved material which is structurally strong enough to maintain a rigid or semi-rigid shape, and heat resistant enough to maintain its function at temperatures up to approximately 250° F.

Another preferred method of operation of the invention involves sheet 90 of corrugated material as shown in FIG. 6. In FIG. 6, there is shown baking can 92 with lid 94. Baking can 92 is provided with ledge 96, which may be used for instance to support sheet 90. Sheet 90 is a corrugated material made of parchment, plastic, metal, or other food-approved semi-rigid material. The corrugations formed in sheet 90 are necessary to allow passage of gases A from center area 91 of baking can 92 as baking progresses through unclinched outer edge 98. The gases are of course evolved from baked product 22 as baking occurs.

If corrugated sheet 90 extends across the entire surface of baking can 92 as is shown in FIG. 6, means must be provided to allow for entrance of gases A from center area 91 to the volume defined by lid 94 and the upper side of sheet 90. One method of providing this passage is to perforate sheet 90, such as is shown in FIG. 6a. The corrugations in sheet 90 prevent baked product 22 from plugging the passages provided for exit of gases A and perforations 102 provide for exit of gases from the entire central area of 91 over obstruction boundary 26 caused by baked product 22 rising into contact with the underside of sheet 90.

Although sheet 90 may be placed in baking can 92 so as to rest on ledge 96, the objects of the invention are also accomplished by placing sheet 90 directly on baked product 22 (batter) after the batter is placed in baking can 92. Thus, as baked product 22 rises, sheet 90 rises and gases A exit as heretofore described.

If it is not desired that sheet 90 be dimensioned so as to cover the entire surface of baking can 92, corrugated strips 110 may be utilized as indicated in FIG. 6b. Strips 110 may be of sufficient length to rest on ledge 96, or may simply be placed on baked product 22 (batter) and rise with baked product 22 as baking progresses. The dimensions of corrugated strips 110 must be sufficient to extend through central area 91 and extend beyond obstruction boundary 26, so that gases A may be allowed to exit as shown in FIG. 6b. Corrugated strips 110 need be no more than two or more complete corrugations; that is, two peaks, and exit of gases is facilitated by placing of one strip 110 in generally the central area of baking can 92, extending across the length or width of baking can 92. However, more than one corrugated strip 110, placed generally in the central area of baking can 92 and extending across its length or width will improve the exit of gases A.

Although not necessary to achieve the exit of gases A with strip 110, a further improvement in the exit of gases occurs if perforations, such as those shown in FIG. 6a, are placed in the corrugation of strips 110.

The following examples describe the mixtures attainable according to the present invention. The mixes given contain lower amounts of flour, eggs and milk than would normally be required for the extended shelf lives obtained. The resultant products are light, evenly baked with an even, moist texture.

| | DEVIL'S FOOD CAKE | |
|---|---|---|
| Ingredient | Fresh Cake Formulation (Parts by Weight) | Long Shelf Life Formulation (Parts by Weight) |
| Sugar | 41.8 | 48 |
| Shortening | 9.0 | 12 |
| Polysorbate 60 | 0.10 | 0.1 |
| Sorbitan monostearate | 0.40 | 0.4 |
| Hard Monoglycerides | 0.25 | 0.25 |
| Plastic monoglycerides | 0.25 | 0.25 |
| Salt | 0.75 | 0.75 |
| Cake Flour | 36.5 | 40 |
| Lecithin | 0.1 | 0.1 |
| Cocoa (Dutch process) | 4.0 | 4.0 |
| Nonfat dried milk | 0.70 | 1.5 |

-continued

DEVIL'S FOOD CAKE

| Ingredient | Fresh Cake Formulation (Parts by Weight) | Long Shelf Life Formulation (Parts by Weight) |
|---|---|---|
| Dried whole eggs | 4.0 | 5 |
| Bicarbonate of soda | 1.15 | 1.15 |
| Water (Variable) | 40 | 40 |

GINGERBREAD

| Ingredient | Fresh Cake Formulation (Parts by Weight) | Long Shelf Life Formulation (Parts by Weight) |
|---|---|---|
| Sugar | 40.0 | 45.0 |
| Shortening | 8.0 | 10.0 |
| Dried Molasses | 9.0 | 9.0 |
| Salt | 0.7 | 0.7 |
| Bread flour | 18.0 | 15.0 |
| Cake flour | 20.0 | 25.0 |
| Caramel color | 0.1 | 0.1 |
| Spice mix | 2.0 | 2.0 |
| Nonfat dried milk | 1.2 | 3.0 |
| Bicarbonate of soda | 1.0 | 1.0 |
| Water (Variable) | 40.0 | 40.0 |

ROLLS & BREAD

| Ingredient | Fresh Formulation (Parts by Weight) | Long Shelf Life Formulation (Parts by Weight) |
|---|---|---|
| Bread flour | 84.0 | 84.0 |
| Sugar | 4.20 | 16.0 |
| Shortening | 4.25 | 16.0 |
| Nonfat dried milk | 4.25 | 6.0 |
| Salt | 2.00 | 2.0 |
| Sodium Stearoyl-2-lactylate | 0.50 | 0.50 |
| Calcium propionate | 0.25 | 0.25 |
| Mono-diglycerides [1] | 0.55 | 0.55 |
| Yeast | 2.0 | 2.0 |
| Water (Variable) | 42.0 | 36.0 |
| Lactic Acid | — | Variable to PH 4.5 |

SWEET DOUGH

| Ingredient | Fresh Formulation (Parts by Weight) | Long Shelf Life Formulation (Parts by Weight) |
|---|---|---|
| Bread flour | 66.50 | 70.0 |
| Sugar | 12.0 | 14.0 |
| Shortening | 12.0 | 14.0 |
| Nonfat dried milk | 3.5 | 5.0 |
| Dried whole eggs | 3.25 | 5.0 |
| Salt | 1.25 | 1.25 |
| Mono-diglycerides [1] | 1.0 | 1.0 |
| Sodium stearoyl-2-lactylate | 0.5 | 0.5 |
| Yeast | 2.0 | 2.0 |
| Water (Variable) | 32.0 | 28.0 |
| Lactic Acid | — | Variable to PH 4.5 |

Although various embodiments and examples of the invention have been described herein, they are intended to be merely illustrative, and various modifications may be made without departing from the spirit and scope of the inventions as hereinafter defined in the following claims.

I claim:

1. A method of preparing baked items in rigid, large lid containers, comprising:
forming a bakery product batter wherein the water activity of the product remains below 0.95% relative humidity;
placing an amount of said batter in said large lid container, said amount being less than the volume of said container to allow for expansion of said batter during cooking;
partially sealing said lid to said container prior to baking;
heating said batter within said partially sealed container until said batter is baked;
directing steam and gases generated during baking from the central area of said container to the periphery of said container through passageways formed with said lid and preventing batter rising during said baking operation from obstructing said passageways such that steam and gas evacuation through said partially sealed container continues unobstructed even after said batter initially rises into close proximity with said lid internal to said rigid container;
cooling said cooked batter to approximately 180° F.; and hermetically sealing said container.

2. Method according to claim 1, including placing a semi-rigid sheet for directing evacuating gases on top of said batter after said batter is placed in said container and before said container is partially sealed.

3. Method according to claim 1, including placing a corrugated sheet for directing evacuating gases on top of said batter after said batter is placed in said container and before said container is partially sealed.

4. Method according to claim 1, including placing one or more corrugated strips for directing evacuating gases on top of said batter after said batter is placed in said container and before said container is partially sealed.

5. A large-size baking can for venting steam and gases during baking, comprising:
said can;
a cover extending over the area of the top of said baking can;
means located on said cover extending from the center area of said cover to the periphery for transferring steam and gases generated along said transferring means during baking to the outer periphery of said cover; and
means for preventing batter contained in said can rising during said baking operation from obstructing said steam and gas transferring means.

6. The can according to claim 5, wherein said cover comprises a lid for said baking can, said steam and gas transferring means are raised channels that are an integral part of said lid, projecting in a direction away from the center area of said baking can, and said means for preventing obstruction of said channels comprises a sheet of food-approved material, heat resistant up to at least 250° F., containing openings for passage of steam and gas.

7. The can according to claim 5, wherein said cover comprises a lid for said baking cans, said steam and gas transferring means are raised channels that are an integral part of said lid, projecting in a direction away from the center area of said baking can; and said means for preventing obstruction of said channels comprises a flap for covering each channel such that the length of said flap approximates the length of said channel, at least one side of the longitudinal dimension of said flap is attached to said lid adjacent one edge of said channel, and said flap is provided with a fluted edge generally perpendicular to said raised channel to allow for passage of steam and gases into said channel.

8. The can according to claim 5, wherein said baking can is provided with a ledge to support said cover above said batter.

9. The can according to claim 5, wherein said steam and gas transferring means are comprised of a multiplicity of tubular members projecting in a direction away from the center area of said cover to its outer periphery, said tubular members being flexible to pressure caused by rising batter, each of said tubular members being opened along its longitudinal axis and attached on one side of said longitudinal opening to said cover to allow for passage of steam and gas through said tubular member.

10. The can according to claim 9, wherein said means for preventing obstruction comprises a flexible flap integral with said tubular member, located on the end of said tubular member nearest said center area for maintaining the transfer of steam and gas from said center area to said outer periphery.

11. The can according to claim 9, wherein the side of said tubular member that is unattached to said cover has a serrated edge.

12. A large size baking can for venting steam and gases during baking comprising:
    said can;
    a sheet extending over the area defined by batter placed in said baking can with sufficient clearance from the inside edges of said baking can to allow vertical movement of said sheet within said baking can;
    steam and gas transferring means comprising multiple channels integral with said sheet, located on said sheet such that said channels project in a direction away from the center area of said baking can, the cross-section of said channels oriented downwardly into said baking can and being configured to provide a space between said channel and the interior side of said sheet so that batter rising into contact with said sheet will not enter said space, said space remaining unobstructed; and
    said sheet containing openings along said channels to provide communication adjacent said space for venting of steam and gases from said baking can;
    a cover extending over the area of the top of said baking can and said sheet.

13. The can according to claim 12, wherein said baking can is provided with a ledge to support said sheet above said batter.

14. A large-size baking can for venting steam and gases during baking, comprising:
    said can;
    a multi-perforated, corrugated food-approved material of sufficient dimensions such that said corrugations extend substantially across the central area of a batter placed in said baking can, said perforations and said corrugations of said material providing paths for transferring steam and gases evolving from said batter as it is baked from along said corrugations to the periphery of said baking can;
    a cover extending over the area of the top of said baking can and said material.

15. The can according to claim 14, wherein said corrugated material comprises a corrugated sheet which extends over the area defined by batter placed in said baking can, with sufficient clearance to allow vertical movement of said sheet within said baking can, and openings are provided in said sheet for transfer of steam and gases from the interior of said baking can to its exterior.

16. The can according to claim 15, wherein said baking can is provided with a ledge to support said sheet above said batter.

17. The can according to claim 14, wherein said corrugated material comprises one or more corrugated strips, each of at least two corrugations.

18. The can according to claim 17, including openings in said corrugated strips for transfer of steam and gases from the interior of said baking can.

19. The can according to claim 17, wherein said baking can is provided with a ledge to support said strips above said batter.

* * * * *